United States Patent [19]
Vanmoor

[11] Patent Number: 5,982,286
[45] Date of Patent: Nov. 9, 1999

[54] OBJECT DETECTING APPARATUS

[76] Inventor: Arthur Vanmoor, 153 E. Palmetto Park Rd. Suite 219, Boca Raton, Fla. 33432

[21] Appl. No.: 09/079,583

[22] Filed: May 15, 1998

[51] Int. Cl.$^6$ .................................................. G08B 23/00
[52] U.S. Cl. .................. 340/573.4; 340/692; 340/693.5; 340/693.9; 342/24; 342/118; 367/118
[58] Field of Search .............................. 340/573.4, 573.1, 340/825.19, 693.5, 693.6, 693.9, 693.12, 435, 436, 903, 692, 328, 691.3, 691.8; 342/24, 118; 367/910, 909, 118–120, 99, 112, 129

[56] References Cited

U.S. PATENT DOCUMENTS

| | | | |
|---|---|---|---|
| 3,172,075 | 3/1965 | Kay | 367/102 |
| 3,366,922 | 1/1968 | Kay | 367/102 |
| 3,742,433 | 6/1973 | Kay et al. | 367/96 |
| 4,761,770 | 8/1988 | Kim et al. | 367/116 |
| 5,235,316 | 8/1993 | Qualizza | 340/436 |
| 5,453,740 | 9/1995 | Gallagher et al. | 340/903 |
| 5,627,510 | 5/1997 | Yuan | 340/435 |

*Primary Examiner*—Thomas Mullen
*Attorney, Agent, or Firm*—Herbert L. Lerner; Laurence A. Greenberg; Ralph E. Locher

[57] ABSTRACT

An object detecting apparatus includes at least one transmitter and receiver pair having a transmitter for transmitting waves and a receiver for detecting reflected waves caused by objects reflecting the transmitted waves. The receiver outputs reflected wave detected signals in response to detecting reflected waves. A control unit is connected to the at least one transmitter and receiver pair for providing transmit control signals to the transmitter and for receiving and evaluating the reflected wave detected signals from the receiver. The control unit also determines a distance between the receiver and the object. There is also provided at least one speaker connected to the control unit for providing an audible signal.

10 Claims, 2 Drawing Sheets

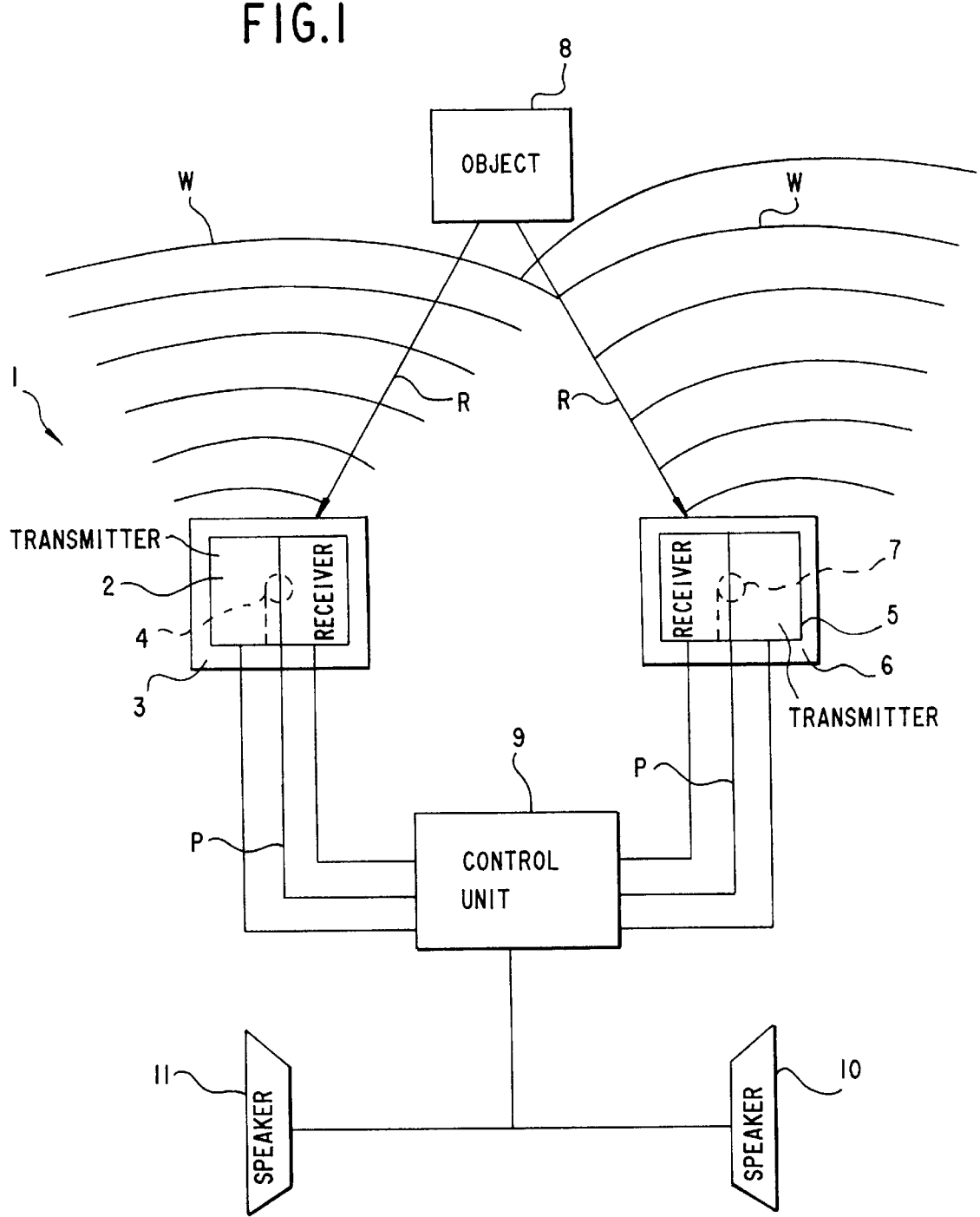

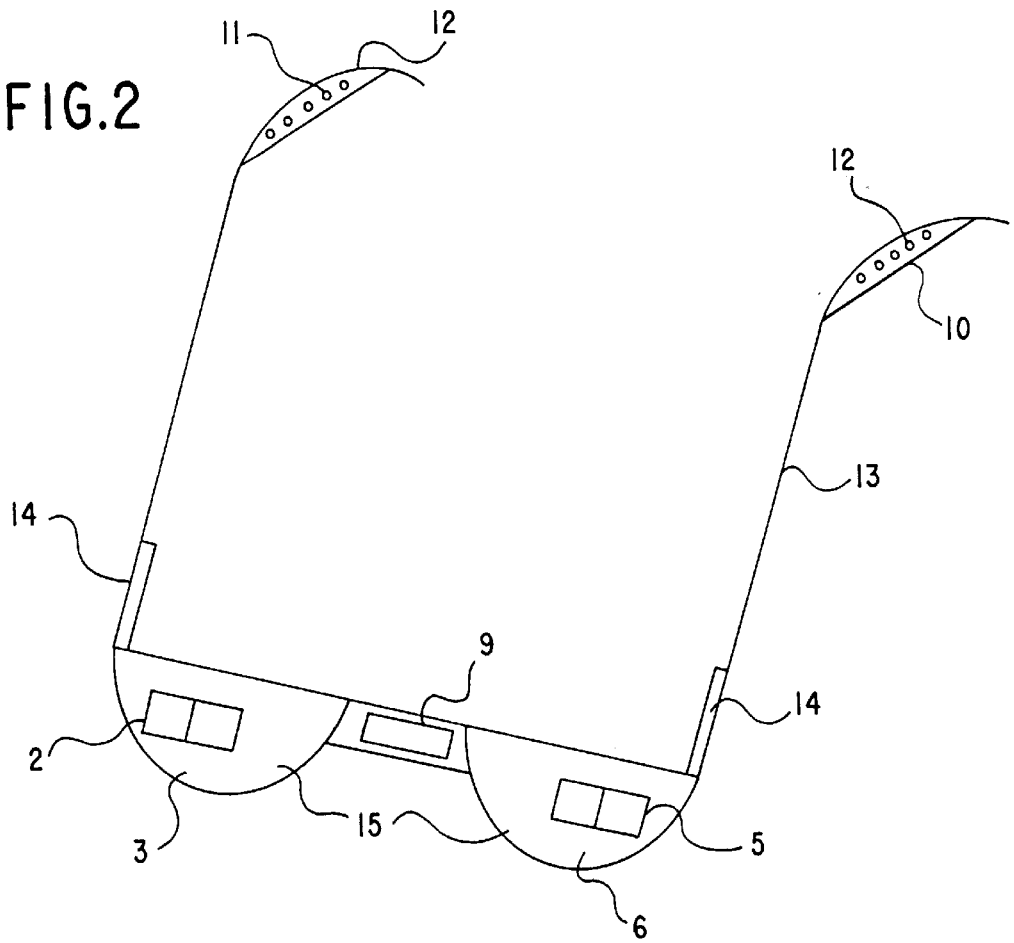
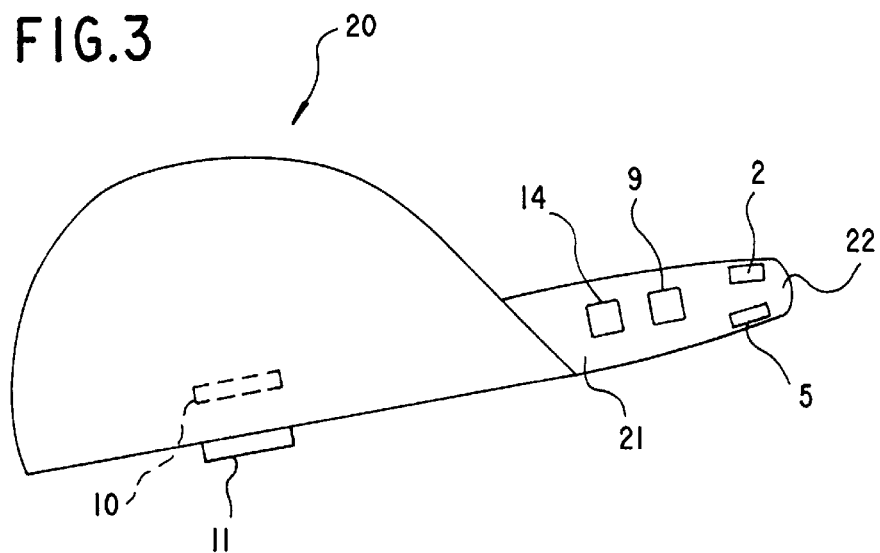

5,982,286

OBJECT DETECTING APPARATUS

BACKGROUND OF THE INVENTION

1. Field of the Invention

The invention relates, generally, to a device which assists visually impaired people in determining the location and distance to objects in their immediate vicinity.

2. Description of the Related Art

The options available to assist a visually impaired person such as a blind person in detecting objects in his/her travel path are limited. A white walking stick is the most popular form of aid available to assist a visually impaired person. However, the effective range of the cane is limited by the length of the cane. In addition, the proper use of the cane requires a constant labor intensive sweeping motion of the cane as the user progresses in his or her travel direction.

Seeing eye dogs are another popular aid to assist the visually impaired. However, the time and effort in training a dog to be a seeing eye dog is expensive and time consuming. Although dogs make excellent companions they also require being fed, walked, groomed, bathed, etc.. In addition, seeing eye dogs are not always accepted in some social situations or residences (i.e. restaurants, apartment complexes).

SUMMARY OF THE INVENTION

It is accordingly an object of the invention to provide an object detecting apparatus which overcomes the above-mentioned disadvantages of the prior art devices and methods of this general type, and which provides a easy to use and effective device for detecting the presence of objects in the vicinity of the user.

With the foregoing and other objects in view there is provided, in accordance with the invention, an object detecting apparatus, including: at least one transmitter and receiver pair which has a transmitter for transmitting waves and a receiver for detecting reflected waves caused by objects reflecting the transmitted waves, the receiver outputting reflected wave detected signals in response to detecting the reflected waves; a control unit connected to the at least one transmitter and receiver pair for providing transmit control signals to the transmitter and for receiving and evaluating the reflected wave detected signals from the receiver, the control unit determines a distance between the receiver and the object; and at least one speaker connected to the control unit for providing an audible signal.

In accordance with an added feature of the invention, there is a body member upon which the at least one transmitter and receiver pair, the control unit and the at least one speaker are mounted.

In accordance with another feature of the invention, the at least one transmitter and receiver pair is two transmitter and receiver pairs.

In accordance with an additional feature of the invention, the at least one transmitter and receiver pair transmits ultrasonic waves.

In accordance with yet another added feature of the invention, the at least one transmitter and receiver pair transmits the waves at a frequency not detectable by a human observer.

In accordance with a further added feature of the invention, there is at least one power source disposed on the body member and electrically connected to the at least one transmitter and receiver pair, the control unit and the at least one speaker.

In accordance with yet another feature of the invention, the body member is a cap.

In accordance with yet another additional feature of the invention, the at least one speaker is two speakers.

In accordance with yet a further added feature of the invention, the body member is embodied as an eyeglass frame.

In accordance with yet another further feature of the invention, the cap has a rim with a front section and the transmitter and receiver pair is disposed in the front section of the rim.

In accordance with yet another further additional feature of the invention, the eyeglass frame has two lens sections and one of the at least one transmitter and receiver pair is disposed in each of the two lens sections.

In accordance with a concomitant feature of the invention, the at least one transmitter and receiver pair has a disk mounting member, the disk mounting member rotatably and pivotably mounting the at least one transmitter and receiver pair on the body member, the transmitter and receiver pairs outputting a position indication signal to the control unit.

Other characteristic features of the invention are set forth in the appended claims.

Although the invention is illustrated and described herein as embodied in an object detecting apparatus, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of specific embodiments when read in connection with the accompanying drawings.

BRIEF DESCRIPTION OF THE DRAWINGS

FIG. 1 is a block diagram of an object detecting apparatus according to the invention;

FIGS. 2 is a diagrammatic, top perspective view of the object detecting apparatus configured in a form resembling eyeglass frames; and FIG. 3 is a side-elevational view of the objected detecting apparatus configured in the form of a cap.

DESCRIPTION OF THE PREFERRED EMBODIMENTS

Referring now to the figures of the drawing in detail and first, particularly, to FIG. 1 thereof, there is shown a block diagram of the main components forming an object detecting device 1. The object detecting device 1 includes a first transmitter and receiver pair 2 mounted on a housing 3. The transmitter and receiver pair 2 are rotatably and pivotally mounted on the housing 3 by a rotatable and pivotable disk 4. A second transmitter and receiver pair 5 is also rotatably and pivotally mounted on a housing 6 by a rotatable and pivotable disk 7. The transmitter and receiver pairs 2, 5 emit waves W such as ultrasonic waves. The waves W are reflected R by objects 8 in the path of the wave W and the reflected waves R are detected by the receivers of the transmitter and receiver pairs 2, 5. The receivers output reflected wave detected signals.

A control unit 9 controls the transmission of the waves W by the transmitters 2, 5. The control unit 9 provides a transmit signal to the transmitters 2, 5 which in turn transmit a wave W in response to the transmit signal. A short time later the receivers 2, 5 detect reflected waves R that are reflected off the object 8 and transmits a reflected wave detected signal to the control unit 9. The control unit 9 calculates a distance to the object 8 from the time delay between the transmit and detected signals, the properties of the type of chosen transmitted wave, and the properties of the transmission media (i.e. air). Ultrasonic wave transmitter/receiver pairs are preferred as they can operate at a frequency range that is not detectable by human senses. In this manner, the operation of the object detecting device 1 will not cause a disturbance.

By using two transmitter and receiver pairs 2, 5, one can determine both horizontal and vertical reference distances to the object 8. In addition, the disks 4 and 7 can position (i.e. pivot or rotate) the transmitter and receiver pairs 2, 5 at various positions to provide a variable field of view depending on the user's preference. In this manner, the user can set the device to provide a wide field of view or a more narrow field of view. The transmitter and receiver pairs 2, 5 provide position signals P to the control unit 9 to provide the necessary position indicators and guidance signals to the control unit 9.

The control unit 9 provides audible signals for driving speakers 10 and 11. The audible signals can be in the form of a verbal message (i.e. object is 5 feet away), in the form of intensity signals (i.e. a stronger, more frequent beep as an object gets closer) or one of many other forms of audible warning signals.

FIG. 2 shows the object detecting device 1 incorporated into an eyeglass frame configuration. An eyeglass frame 13 houses all of the necessary components. The housings 3, 6 for mounting the transmitter and receiver pairs 2, 5 are located at the front or lens position 15 of the eye glass frame 13. In other words, the housings 3 and 6 are the lenses of traditional glasses. The control unit 9 is arbitrarily located between the housings 3, 6. A pair of batteries 14 are also incorporated into the eyeglass frame 13 for providing a power source. The speakers 10, 11 are integrally mounted into the eyeglass frame 13 at ear engaging ends 12 of the eyeglass frame 13. The eyeglass frame 13 also contains the non-illustrated wires that interconnect the various components.

FIG. 3 shows an alternative embodiment of the invention in which the major components are incorporated into a cap 20. The cap 20 has a rim 21 with a front section 22 on which the transmitter and receiver pairs 2, 5, the control unit 9, and the batteries 14 are disposed. The speakers 10, 11 are positioned on the cap 20 above the area in which the cap 20 lies above the wearer's ears. In alternative embodiments, a hat, a visor, or any other suitable piece of head wear would suffice. In addition, the device could be mounted on other articles of clothing that can be worn or strapped to a user.

I claim:

1. An object detecting apparatus, comprising:

at least one transmitter and receiver pair having a transmitter for transmitting waves and a receiver for detecting reflected waves caused by objects reflecting the transmitted waves, said at least one transmitter and receiver pair outputting position indication signals and said receiver outputting reflected wave detected signals in response to detecting the reflected waves;

a control unit connected to said at least one transmitter and receiver pair for providing transmit control signals to said transmitter and for receiving and evaluating the reflected wave detected signals from said receiver and the position indication signals from said at least one transmitter and receiver pair, said control unit determining a distance between said receiver and the object;

at least one speaker connected to said control unit for providing an audible signal; and a body member for housing said at least one transmitter and receiver pair, said control unit and said at least one speaker, said at least one transmitter and receiver pair having a disk mounting member rotatably and pivotably supporting said at least one transmitter and receiver pair on said body member.

2. The object detecting apparatus according to claim 1, wherein said at least one transmitter and receiver pair is two transmitter and receiver pairs.

3. The object detecting apparatus according to claim 1, wherein said at least one transmitter and receiver pair transmits ultrasonic waves.

4. The object detecting apparatus according to claim 1, wherein said at least one transmitter and receiver pair transmits the waves at a frequency not detectable by a human observer.

5. The object detecting apparatus according to claim 1, including at least one power source disposed on said body member and electrically connected to said at least one transmitter and receiver pair, said control unit and said at least one speaker.

6. The object detecting apparatus according to claim 1, wherein said body member is a cap.

7. The object detecting apparatus according to claim 6, wherein said cap has a rim with a front section and said transmitter and receiver pair is disposed in said front section of said rim.

8. The object detecting apparatus according to claim 1, wherein said at least one speaker is two speakers.

9. The object detecting apparatus according to claim 1, wherein said body member is embodied as an eyeglass frame.

10. The object detecting apparatus according to claim 9, wherein said eyeglass frame has two lens sections and one of said at least one transmitter and receiver pair is disposed in each of said two lens sections.

\* \* \* \* \*